United States Patent Office 3,453,213
Patented July 1, 1969

3,453,213
CHELATES OF TITANOUS COMPOUNDS STABLE AT A pH GREATER THAN 5
Robert C. Wade, Ipswich, Mass., assignor to Ventron Corporation, Beverly, Mass., a corporation of Massachusetts
No Drawing. Filed Sept. 15, 1966, Ser. No. 585,706
Int. Cl. C11d 7/54
U.S. Cl. 252—105          10 Claims

ABSTRACT OF THE DISCLOSURE

The invention provides a reducing compositon consisting essentially of a mixture of a titanous salt, such as titanous chloride or titanous sulfate, and an organic chelating agent selected from the group consisting of N-hydroxyethylenediamine triacetic acid, diethanol glycine, glucoheptonic acid, arabonic acid, gluconic acid, galactonic acid, saccharic acid, mucic acid and their sodium and ammonium salts. This mixture is stable in an aqueous medium having a pH greater than 5 and even in solutions containing 2 to 3 percent of sodium hydroxide or its alkaline and can be used as the reducing agent for organic compounds, such as vat dyes, where a high pH is desired.

---

This invention relates to chelates of titanous compounds and, more particularly, to such chelates which are stable in aqueous solution at a pH greater than 5.

Very strongly acidic aqueous solutions of titanous ($Ti^{+3}$) salts, such as titanous chloride ($TiCl_3$) and titanous sulfate [$Ti_2(SO_4)_3$] have long been known to be reducing agents capable of reducing, stripping or discharging of dyes from textile materials. Several compositions of titanous salts in strongly acid aqueous solutions are items of commerce. Most of these also have by-product salts dissolved in these solutions. Thus, zinc-reduced material also contains almost as much zinc chloride as titanium trichloride as shown by the equation:

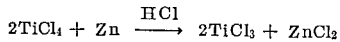

$$2TiCl_4 + Zn \xrightarrow{HCl} 2TiCl_3 + ZnCl_2$$

These solutions also contain 6–8 percent of free hydrochloric acid. When sodium hydroxide is added to dilute solutions of these products or to pure titanous salts, such as titanous chloride, made by hydrogen reducation, a precipitate of titanous hydroxide [$Ti(OH)_3$] starts to form at a pH of about 3.5. When the pH reaches 5 to 6.5, a floccy precipitate occurs. This precipitate is no longer effective for use in rapidly reducing organic compounds, such as vat dyes.

I have discovered that when a titanous salt, such as titanous chloride or titanous sulfate, which may contain other by-product impurities, is chelated with an organic chelating agent containing at least one hydroxyl group and at least one carbonyl group in an aqueous medium, the reaction product or mixture is stable in an aqueous medium having a pH greater than 5 and even in solutions containing 2 to 3 percent of sodium hydroxide or its alkaline equivalent. The reaction product, therefore, can be used as the reducing agent for organic compounds, such as vat dyes, where a high pH is desired.

The technique for forming the chelates of the invention may be varied since the reaction is extremely fast between he titanous salt and the chelating agent. In general, I prefer to form the chelate by reacting the titanous salt and the chelating agent in water before adding any alkaline material to the system. In other cases, I have very successfully added the chelating agent to an alkaline aqueous solution and then added the titanous salt with stirring. I do not add the chelating agent to a system wherein the titanous salt previously has been precipitated out by alkali. The chelating agent will not redissolve such a precipitate in any reasonable time.

The amount of chelating agent used varies widely depending upon the conditons within the system, for example, pH, temperature and the chelating capacity of the chelating compound. In general, I have found that 0.25 to 10 parts by weight of chelating agent (100 percent active basis) per part by weight of titanous ion ($Ti^{+3}$) is the useful range. In most cases, I prefer to use 2 to 20 parts by weight of chelating agent (100 percent active basis) per part by weight of titanous ion ($Ti^{+3}$) chelated.

The chelates of the invention in alkaline aqueous solution are useful for the reduction of vat dyes and their applications to textile materials, for the stripping or dye removal from textile materials, and for the reduction of other organic and inorganic compounds.

As illustrative of chelating agents which may be used in the practice of the invention, I may mention the following:

(1) N-hydroxyethylenediamine triacetic acid

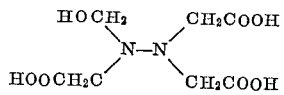

and its trisodium and triammonium salts;

(2) Diethanol glycine

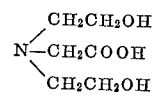

and its sodium and ammonium salts;

(3) Glucoheptonic acid

HOOC—CHOH—CHOH—CHOH—
　　　　　　　　　　　CHOH—CHOH—CH$_2$OH and its sodium and ammonium salts;

(4) Arabonic acid

and its sodium and ammonium salts;

(5) Gluconic acid

and its sodium and ammonium salts;

(6) Galactonic acid

and its sodium and ammonium salts;

(7) Saccharic acid

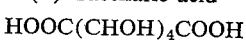

and its sodium and ammonium salts; and (8) Mucic acid

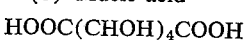

and its sodium and ammonium salts.

The chelating agents of Groups 1 and 2 above are stable at a pH of up to 11 and 12, respectively. Those of Groups 3 to 8 above are stable in aqueous solution containing up to about 3 percent sodium hydroxide or its equivalent.

Example 1

Two ml. of a 1% solution of $TiCl_3$ prepared by hydrogen reduction in water was diluted to 50 ml. with distilled water. pH of this solution was about 2. Then dilute NaOH solution was added with stirring while the pH was continously measured on a pH meter. At a pH of about 3.5, a blue-black color started to form. This continued to increase in tensity as the pH rose to 5–6. At 6.5, a heavy floccy precipitate formed.

Example 2

Fifty ml. of distilled water containing 0.02 g. diethanolglycine sodium salt was mixed with 2 ml. of 1% $TiCl_3$ solution (=0.02 g. $TiCl_3$ ≅.0062 g. $Ti^{+3}$). The initial pH of the solution was 3.0. Dilute NaOH solution was added with stirring. A blue color formed at pH 5-6 and became darker at pH 8. The solution remained transparent to light. No floccy precipitate formed even when the pH was raised to about 12 and the solution remained transparent to light.

Example 3

To 50 ml. distilled water containing 0.01 g. diethanolglycine sodium salt was added 4 ml. of 1% $TiCl_3$ in water (≅.0124 g. $Ti^{+3}$). pH of this solution was 2.4. Then dilute NaOH was added with stirring, constantly measuring the pH. At pH 3, a blue-black color formed. This color was very deep at pH 4.5 and the solution was opaque at pH of 6.5 at this concentration. Examination of an aliquot showed no floccy precipitate, however, and upon dilution, the solution was transparent. The solution remained dark as the pH was raised to about 11.5. No floccy precipitation occurred.

Example 4

To 50 ml. of distilled water containing 0.05 g. of diethanolglycine sodium salt was added 2.5 ml. of 1% $TiCl_3$ solution (≅0.0078 g. $Ti^{+3}$). pH of this solution was 6.5. pH was raised to 12 by adding NaOH. The solution was dark purple and perfectly clear.

Example 5

To 50 ml. of 2% NaOH was added 0.01 g. of sodium glucoheptonate. Then 0.01 g. $TiCl_3$ (1 ml. of 1% solution) was added. The solution remained clear and white. Another 0.01 g. $TiCl_3$ was added. A clear blue-black solution resulted. Another 0.01 g. $TiCl_3$ was added. The solution became darker and less clear but no floc formed. Another 0.01 g. $TiCl_3$ was added and within a few minutes, a small amount of floccy blue-black precipitate former. Thus, 1 part of sodium glucoheptonate prevented the precipitation of 0.9+ parts of $Ti^{+3}$ in 2% NaOH.

Example 6

To 50 ml. of distilled water containing 0.02 g. of the trisodium salt of N-hydroxyethylenediamine triacetic acid was added with stirring 2 ml. of 1% $TiCl_3$. The pH was 2.8 and perfectly clear. The pH was raised to 11.8 with NaOH and the solution had only a faint blue color with no precipitate at pH's up to 12.

Example 7

To 50 ml. of distilled water containing 0.01 g. of trisodium salt of N-hydroxyethylenediamine triacetic acid was added 4 ml. of 1% $TiCl_3$ (=0.04 g. ≅0.012 g. $Ti^{+3}$). pH of solution was 2.0. As NaOH was added, a dark color developed at pH 4.7. The suspension or solution was very dark at pH 10, but no floccy precipitate noted. As pH was increased to 11.5, a floccy precipitate developed.

Example 8

To 50 ml. of 2% NaOH solution was added 0.02 g. sodium glucoheptonate. To this solution was added 6 ml. of a solution containing 1% $TiCl_3$, 0.75% $ZnCl_2$, and about 3.5% HCl. A dark greenish-blue solution formed but no precipitate was noted.

Example 9

A solution was made up which contained 10 g./liter of $TiCl_3$ and 100 g./liter of diethanolglycine sodium salt. This is called "Reducing Solution A" in the experiments below.

25 ml. of a vat dye suspension containing 8 g./liter of Brilliant Green B and Color Index 69825 and 10 ml. of 20 g. NaOH/liter were mixed. Then 80 ml. of reducing solution A was added to the dye suspension. Immediate and complete reduction occurred at 80° F. as the dye turned to a clear deep blue color characteristic of the leuco base color of this dye. The surprising fact was that the dye was reduced instantly at this low temperature. After a minute or so, the unused $Ti^{+3}$ started to precipitate as a black floc.

Example 10

25 ml. of the same green dye suspension as in Example 1 was mixed with 40 ml. of 2% NaOH solution and 40 ml. of 1% sodium glucoheptonate solution. Then 40 ml. of 1% $TiCl_3$ was added. Again, instant reduction occurred at room temperature. No flocculent precipitate occurred on standing.

Example 11

"Reducing Solution B" was prepared as follows:

50 ml. of 1% $TiCl_3$ was mixed with 50 ml. of 1% sodium glucoheptonate. pH of this solution was 2. Then sufficient NaOH was added to raise the pH to 7. 10 ml. of this solution was used to reduce 25 ml. of the following dyes which contained 8 g. of dye/liter mixed with 10 ml. of 20 g./liter NaOH. In each case, instant reduction occurred at room temperature and no flocculent precipitate formed on standing.

| Color index No. | Dye | Sodium leuco color |
|---|---|---|
| 67300 | Algol yellow GC | Violet. |
| 67000 | Indanthrene red FBB | Dull brown. |
| 59825 | Indanthrene brilliant green B | Blue. |
| 69825 | Indanthrene blue BCF | Do. |

Example 12

40 ml. of 2% NaOH was mixed with 40 ml. of 1% $TiCl_3$. A heavy blue-black precipitate formed immediately. This slurry was added to 25 ml. of Brilliant Green B (8 g./liter concentration). No reduction occurred even on standing for 15 minutes. This shows that precipitated $Ti^{+3}$ is ineffective for vat dye reductions.

Example 13

To 50 ml. of 2% NaOH was added 30 ml. of 1% sodium glucoheptonate. Then 25 ml. of 1% $TiCl_3$ was added with stirring. A dark blue-black color developed but no flocculent precipitate appeared. A piece of heavy-weight cotton twill dyed with a vat khaki color was added to this solution. Sample was boiled in this solution for 30 minutes. The color of the solution remained dark during this period and no precipitation of $Ti^{+3}$ occurred. This demonstrates the remarkable stability of the $Ti^{+3}$ glucoheptonate chelate. At the end of this period, the cloth sample was washed and dried. Considerable amount (80–90%) of the dye was stripped from the cloth as evidenced by the much lighter shade of the cloth.

I claim:

1. A reducing composition consisting essentially of a mixture in an aqueous medium of a chelating agent and a titanous salt in the proportion of from about 0.25 part to about 10 parts by weight of chelating agent (100 percent active basis) to 1 part by weight of titanous ion ($Ti^{+3}$), said titanous salt being selected from the group consisting of chloride and sulfate, said chelating agent being selected from the group consisting of N-hydroxyethylenediamine triacetic acid, diethanol glycine, glucoheptonic acid, arabonic acid, gluconic acid, galactonic acid, saccharic acid, mucic acid and their sodium or ammonium salts.

2. The composition claimed by claim 1 wherein the chelating agent is N-hydroxyethylenediamine triacetic acid.

3. The composition claimed by claim 1 wherein the chelating agent is the trisodium salt of N-hydroxyethylenediamine triacetic acid.

4. The composition claimed by claim 1 wherein the chelating agent is the triammonium salt of N-hydroxyethylenediamine triacetic acid.

5. The composition claimed by claim 1 wherein the chelating agent is diethanol glycine.

6. The composition claimed by claim 1 wherein the chelating agent is the sodium salt of diethanol glycine.

7. The composition claimed by claim 1 wherein the chelating agent is the ammonium salt of diethanol glycine.

8. The composition claimed by claim 1 wherein the chelating agent is glycoheptonic acid.

9. The composition claimed by claim 1 wherein the chelating agent is the sodium salt of glycoheptonic acid.

10. The composition claimed by claim 1 wherein the chelating agent is the ammonium salt of glucoheptonic acid.

References Cited

UNITED STATES PATENTS 2,549,099  4/1951  Kaswell _____ 8—102 XR

MAYER WEINBLATT, *Primary Examiner.*

U.S. Cl. X.R.

8—2, 34, 82, 102; 252—188